July 28, 1953  F. S. CARVER  2,646,959
VALVE FOR CONTROLLING HIGH PRESSURE FLUIDS
Filed July 8, 1946
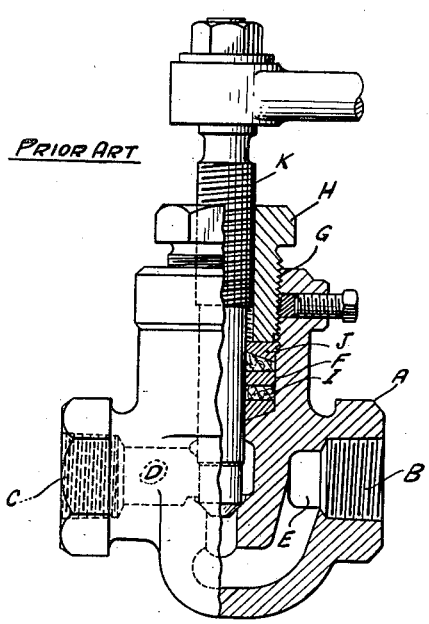
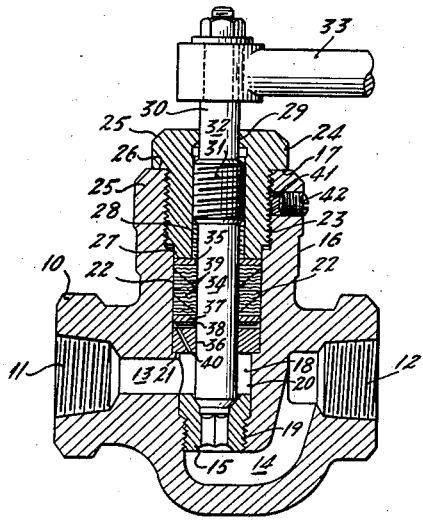
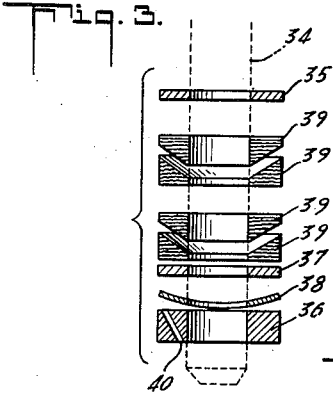
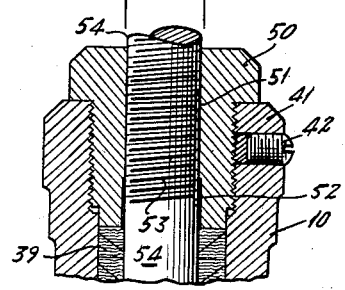
INVENTOR
FRED S. CARVER
BY
ATTORNEY Patented July 28, 1953

2,646,959

UNITED STATES PATENT OFFICE 2,646,959

VALVE FOR CONTROLLING HIGH PRESSURE FLUIDS

Fred S. Carver, Short Hills, N. J., assignor to Fred S. Carver, Inc., Summit, N. J., a corporation of New York Application July 8, 1946, Serial No. 681,990

5 Claims. (Cl. 251—50)

The present invention relates to valves for controlling high pressure fluids, and is more particularly directed toward the provision of valves of this character with improved means for packing the valve and means whereby the valve stem cannot be accidentally removed from the valve.

High pressure valves designed to handle fluids at pressures of the order of 6,000 pounds per square inch must be constructed in an extremely rugged manner and designed to withstand the great pressures. The hydraulic plug type valve generally used has a stem threaded through a gland which gland screws down on a packing around the stem. This must be screwed down with great pressure against the packing to withstand the hydraulic pressure. This has the disadvantage that the pressure on the packing is uncertain, and usually too high or too low, so that it gives excessive friction and packing wear if too tight, and leaks if too loose, requiring constant attention and maintenance. In addition the stem of this type valve may be accidentally screwed out of the gland, under pressure, in which case it becomes a dangerous projectile and has been the cause of many serious accidents and shutting down of equipment.

The purpose of the present valve is to eliminate these two faults, providing a valve with a soft, but tight, non-metallic packing which is self-sealing under the internal pressure, eliminating adjustment, excessive friction, maintenance and danger of the old type valves.

Instead of employing a gland nut to apply compression to packing material the present invention contemplates the use of packing material in a cylindrical chamber of predetermined size, and compression of the packing material resulting from the fluid pressure is relied upon to cause the packing material to occupy the entire packing space and seal tight against the full pressure.

This application is a continuation in part of my application for patent, Serial No. 478,023, filed March 4, 1943, and, without abandoning the invention therein disclosed, abandoned on July 9, 1946, in favor of the present application.

The accompanying drawings show, for purposes of illustrating the present invention, a typical prior art plug type high pressure valve, and an embodiment in which the invention may take form, together with modifications of certain parts, it being understood that the drawings are illustrative of the invention rather than limiting the same.

In these drawings:

Figures 1 and 2 are longitudinal sectional views through a prior art valve and the new valve, both taken at the same scale;

Figure 3 is a sectional view showing the packing and associated washers separated; and Figure 4 is a fragmentary view similar to Figure 2 showing a modified form of construction.

The drawings illustrate the invention as applied to a stop valve with inlet and outlet openings in line, but it is understood that the invention is applicable to angle valves, check valves and the usual forms of pressure valves.

The prior art valve (which is typical of those in general use for controlling high pressure fluids) has a valve body A with threaded openings B and C and passageways D and E. The body is bored at F to form a packing chamber and threaded at G for a gland nut H. Packing I including a follower ring J is received in the packing chamber and a valve stem K is threaded through the gland nut. In this valve the gland nut H is threaded down onto the packing F to compress it. The pressure on it must exceed that of the liquid to be controlled for otherwise the packing would leak. As there is no way for the mechanic to know what pressure exists the tendency is to force the gland nut against the packing so hard as to compress the packing unnecessarily, resulting in loss of life in the packing, difficulty in adjusting the valve stem and excessive wear of valve stem and packing. The latter troubles may bring about leakage which calls for further tightening to aggravate the trouble. Valves of this type, i. e. with a gland nut, or equivalent, threaded down against packing in a closed chamber, require frequent attention and often involve the shut down of operations while packing is being adjusted or replaced.

Such prior art valves also have the disadvantage that the valve stem can be accidentally unscrewed from the gland causing loss of contents of the high pressure lines, and serious damage to equipment and personnel.

As shown in Figure 2, the valve body 10 has threaded openings 11 and 12 and passageways 13 and 14 of conventional form. These passageways are interconnected by a tubular seat forming member 15 described and claimed in my Patent 2,399,102, April 23, 1946.

The body 10 has a cylindrical extension 16 coaxial with the valve seat member and extending upwardly. It has a flat outer face 17 and a cylindrical bore designated generally by the reference character 18. The lower end of this bore is threaded at 19 to receive the valve seat member 15. The bore is cylindrical, as indicated at 20, and has an upwardly facing shoulder 21 above the passageway 13. The bore is cylindrical above this shoulder as indicated at 22. Above this cylindrical portion it is threaded as indicated at 23. This threaded opening in the cylindrical extension of the valve body receives a gland nut 24 having an outwardly flanged head 25 whose lower face 26 is adapted to be threaded down tightly against the face 17 of the valve body. The lower end 27 of the gland nut is cylindrical to fit the cylindrical bore 22 so as to provide a chamber of predetermined length between its lower face and the shoulder 21. The gland nut 24 is internally threaded from the lower end as indicated at 28, but this threading does not extend all the way through the nut. The head of the nut is provided with a bore 29 of reduced diameter relative to the threads.

The valve stem is indicated at 30. It has an intermediate portion 31 threaded to fit the threads in the gland nut, an upper portion 32 of reduced diameter to pass through the small opening 29 of the gland nut where it may be secured to a suitable handle such as indicated at 33. The lower portion 34 of the valve stem is cylindrical and is of such a length as to extend down and meet the valve seat when the valve stem is threaded down a predetermined distance below the top of the valve nut.

The lower part of the valve stem passes through a series of washers and non-metallic packing rings which may be assembled in various orders. As shown in Figure 3, there is an upper metal washer 35, a lower metal washer 36, an intermediate metal retaining washer 37, a resilient spring washer 38, and a number of packing rings 39. These packing rings are of soft compressible material usually with asbestos or fabric reinforcing. They fit the cylindrical bore and the stem and when compressed axially expand to engage the inside walls and stem without voids. The washer 38 is bent into a shallow U-shaped cross-section as indicated in Figure 3. The washer 37 acts as a follower for the packing. The over all length of these parts, when the washer 38 is free of pressure, is in the neighborhood of ⅛" greater than the spacing between the shoulder 21 and the gland nut, so that when the gland nut is threaded down the washer 38 is nearly flat and the packing is under light but known initial compression.

As shown in the drawings the washer 36 is provided with a drilling 40 to insure that the liquid can readily pass into the annular space between the washers 36 and 37. Instead of the drilling 40 a slight looseness of fit of the washer 36 may be provided to afford leakage of fluid up to the packing material.

As a result of this arrangement the spring washer gives a light initial pressure on the packing and together with the hydraulic pressure operating in the annular space below the packing gives a pressure on the packing at all times just slightly in excess of the hydraulic pressure, thus eliminating all leakage. It has been found by experience that, if the packing is closely fitted, it will hold temporarily without the spring washer, but the spring insures that the packing is always set tight and compensates for packing wear, without adjustment.

As shown in Figure 2 the valve stem is in the closed position so that there is a predetermined spacing between the enlarged part of the valve stem and the small part of the gland nut. It is therefore obvious that a certain number of turns of the valve stem will bring the valve stem up to the upper limit of its movement and limit the normal lift of the valve stem. The operator can be certain that the valve is fully open and further turning out is prevented. In order that it would be impossible to use the handle on the valve stem to accidentally loosen the gland nut, the gland nut is locked in place by lead plug 41 under a screw 42. This non-screwing out feature also makes it impossible to back the valve stem out far enough to allow the reduced part of the valve stem to come above the lower packing element. Such is possible in the prior art valve illustrated.

In the arrangement shown in Figure 4, the gland nut 50 is adapted to be threaded into the valve body 10 as before. The gland nut is threaded from the top as indicated at 51 and counterbored from below for close working clearance as indicated at 52 to clear the threads 53 on the valve stem 54. There is no space between the stem and lower face of the gland so that the soft packing 39 may be used without an upper washer. The opening of the valve is controlled by the engagement of the unthreaded portion of the stem with the threads in the gland nut above the counterbore.

Attention is particularly directed to the fact that a single piece, namely, the element 24, or 50, or 66, serves as the bonnet for the valve body, and a fixed gland for absorbing the packing thrust and cooperates with the threaded stem to allow the adjustment of the latter and provide a stop against screwing it out.

It is obvious that the invention may be embodied in many forms and constructions within the scope of the claims and I wish it to be understood that the particular forms shown are but a few of the many forms. Various modifications and changes being possible, I do not otherwise limit myself in any way with respect thereto.

What is claimed is:

1. In a valve, a body adapted to be subjected to internal fluid pressures of the order of 6,000 lbs. per square inch, a cylindrical threaded valve stem extending outwardly from the interior of the body, the body having a cylindrical bore concentric with the valve stem and provided with an outwardly facing shoulder, a removable gland through which the valve stem extends, the valve stem having a reduced diameter which provides an annular space between the gland and valve stem, the gland being fixedly carried by the body in predetermined position and forming, together with the valve stem, the wall of the bore and the shoulder an inwardly opening annular cylindrical chamber of fixed predetermined dimensions, packing completely filling the end of said chamber adjacent the gland and including a rigid washer bridging said space, a soft, compressible packing material, a rigid follower slidably fitting the bore and valve stem and engaging the entire inner face of the packing to completely confine the packing between the gland, the wall of the bore, the valve stem and the follower, and a spring between the shoulder and follower, the spring, the follower, rigid washer and the packing, when the spring is free of compression, occupying a space greater than the over all length of the said chamber, the spring being partially compressed when the spring, the follower and the packing are forced to occupy said chamber, so that it then provides the sole source of axial pressure on the packing and forces the packing laterally against the valve stem and cylinder walls to seal the chamber and prevent low pressure leakage, and whereby when subjected to hydraulic pressure in the valve the packing is under the sum of said pressures and tightly seals the chamber against high pressure.

2. A valve as claimed in claim 1, wherein the spring is in the form of a deformed spring washer, and an inner rigid washer is between the spring washer and the shoulder in the body.

3. A valve for controlling high pressure fluids, comprising a valve body having a threaded opening leading to a cylindrical bore which includes an outwardly facing shoulder, a gland nut threaded into the body and against a fixed stop, the nut having a reduced end and entering the cylindrical bore and providing a packing chamber of predetermined length between the nut and shoulder, the nut having an interiorly threaded coaxial opening, a valve stem extending through the nut and having threads fitting the opening in the nut and a cylindrical inner portion extending through the packing chamber, two metal washers fitting the bore and valve stem, a spring washer, an intermediate washer, the spring washer being between the intermediate washer and one of the metal washers, and packing material between the intermediate washer and the other metal washer, the spring washer and packing material being compressed when the nut is fully threaded in place, the packing material absorbing the liquid pressure and preventing leakage of liquid past the packing, the spring washer keeping the packing under compression at all times.

4. In a valve, a body having a cylindrical bore with an outwardly facing shoulder, an internally threaded removable gland, the gland being fixedly carried by the body and forming, together with the valve stem, the wall of the bore and the shoulder an inwardly opening annular cylindrical chamber, a co-axial cylindrical valve stem threaded into the gland and extending outwardly from the interior of the body, the valve stem having a reduced diameter which provides an annular space between the gland and valve stem, packing completely filling the end of said chamber adjacent the gland and including a rigid washer bridging said space, a soft, compressible packing material, a rigid follower slidably fitting the bore and valve stem and engaging the entire inner face of the packing to completely confine the packing between the gland, the wall of the bore, the valve stem and the follower, and a spring between the shoulder and follower, the spring, the follower, rigid washer and the packing, when the spring is free of compression, occupying a space greater than the overall length of said chamber, the spring being partially compressed when the spring, the follower and the packing are forced to occupy said chamber, so that it then provides the sole source of axial pressure on the packing end and forces the packing laterally against the valve stem and the cylinder walls to seal the chamber and prevent low pressure leakage, and whereby when subjected to hydraulic pressure in the valve the packing is under the sum of said pressures and tightly seals the chamber against high pressure.

5. A valve as claimed in claim 4 wherein the spring is in the form of a deformed spring washer, and an inner rigid washer is between the spring washer and the shoulder in the body.

FRED S. CARVER.

References Cited in the file of this patent

UNITED STATES PATENTS

| Number | Name | Date |
|---|---|---|
| 85,606 | Neahr | Jan. 5, 1869 |
| 664,143 | Garlock | Dec. 18, 1900 |
| 877,706 | Duffy | Jan. 28, 1908 |
| 1,509,966 | McFarland | Sept. 30, 1924 |
| 1,994,830 | Nelson | Mar. 19, 1935 |
| 2,342,276 | Hehemann | Feb. 27, 1944 |

FOREIGN PATENTS

| Number | Country | Date |
|---|---|---|
| 169,018 | Great Britain | of 1921 |
| 361,129 | Italy | of 1938 |